No. 831,632. PATENTED SEPT. 25, 1906.
J. C. SCHLEICHER.
MEANS FOR REMOVABLY ATTACHING TIRES UPON VEHICLE WHEELS.
APPLICATION FILED JAN. 10, 1906.
2 SHEETS—SHEET 1
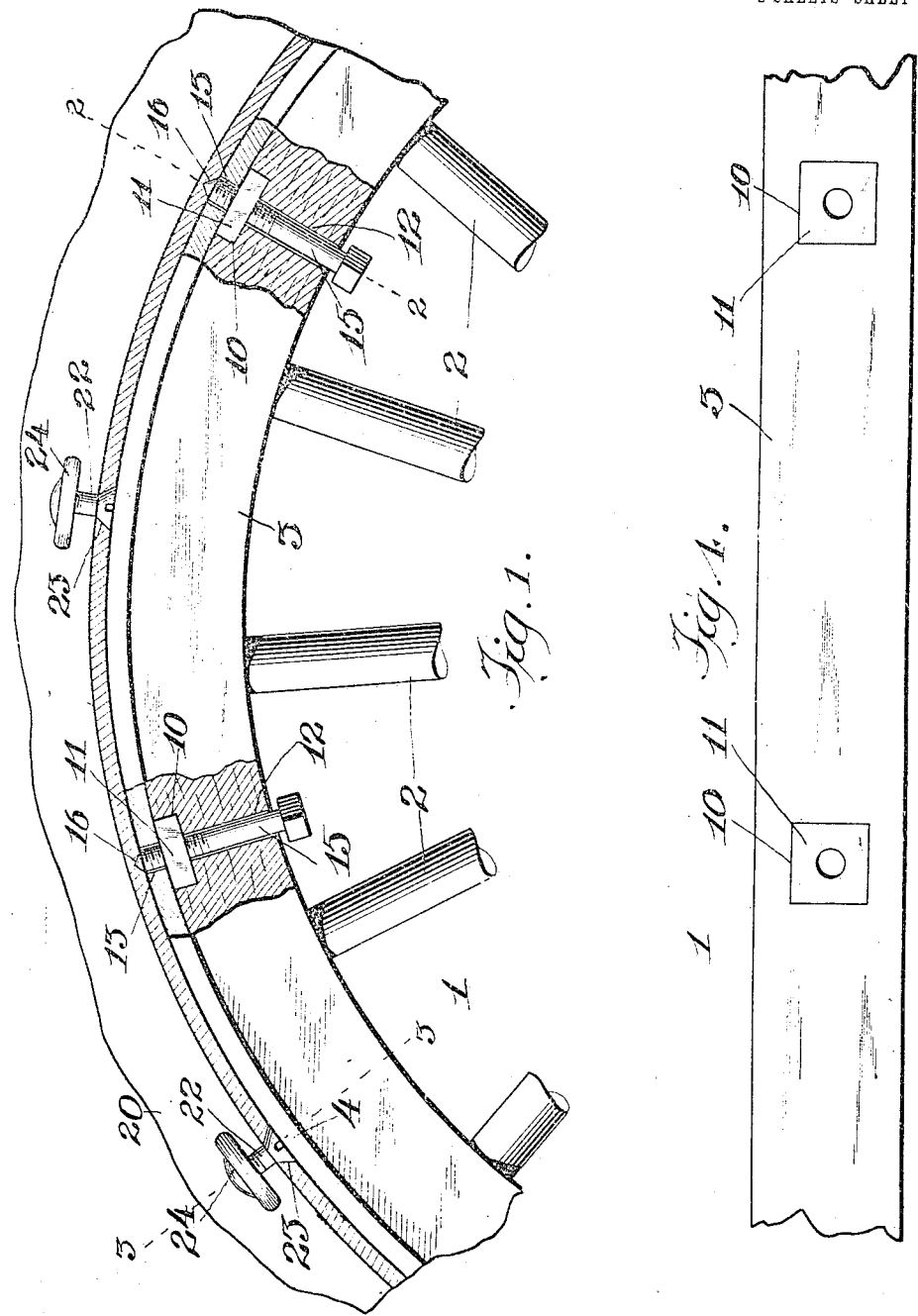

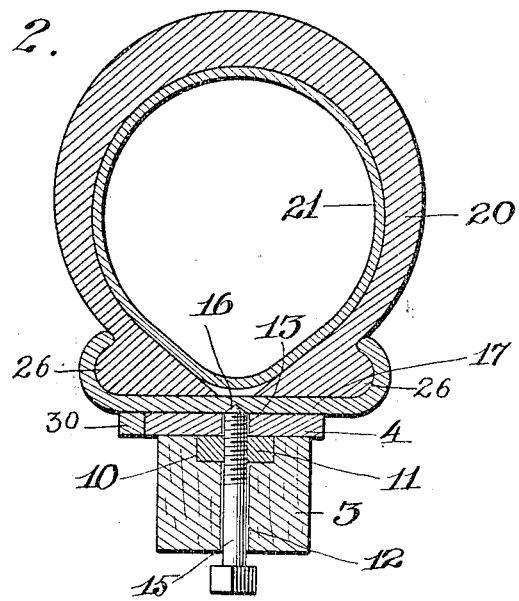
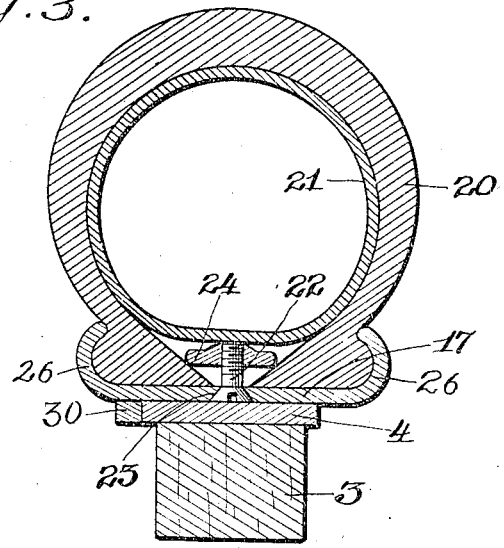

UNITED STATES PATENT OFFICE.

JOHN C. SCHLEICHER, OF MOUNT VERNON, NEW YORK.

MEANS FOR REMOVABLY ATTACHING TIRES UPON VEHICLE-WHEELS.

No. 831,632.      Specification of Letters Patent.      Patented Sept. 25, 1906.

Application filed January 10, 1906. Serial No. 295,344.

*To all whom it may concern:*

Be it known that I, JOHN C. SCHLEICHER, a citizen of the United States, and a resident of Mount Vernon, in the county of Westchester and State of New York, have invented certain new and useful Improvements in Means for Removably Attaching Tires upon Vehicle-Wheels, of which the following is a specification.

My invention relates to means for removably attaching tires upon vehicle-wheels.

It has for its object particularly to removably attach rims of pneumatic tires upon wheels having the ordinary permanently-secured solid metallic tires, whereby if the pneumatic tires become deflated from puncture or other cause they can be easily and readily removed with their rims and replaced by other rims carrying already-inflated tires, or, in case tires have not been carried along for such an emergency, the vehicle can be run home on the solid metallic tires, thereby obviating the necessity for the difficult and lengthy task of removing, mending, and again placing on and inflating punctured tires while on the road or for running home on the pneumatic-tire rims and damaging them in case the pneumatic tires could not be mended.

My invention has for a further object to provide means of the character set forth embodying advantages in point of perfect results and simplicity and inexpensiveness of construction.

In the drawings, Figure 1 is a fragmentary side view of a wheel, showing a pneumatic tire removably secured thereon by the means forming the subject of this invention; Fig. 2, a transverse sectional view taken on the line 2 2 of Fig. 1; Fig. 3, a transverse sectional view taken on the line 3 3 of Fig. 1, and Fig. 4 is a fragmentary plan view of a wheel.

In all the figures of the drawings illustrating my invention like reference characters designate corresponding parts.

Referring to the drawings, 1 designates the wheel; 2, the spokes; 3, the felly, and 4 the ordinary solid metallic tire secured thereon.

Beneath the metallic tire the felly is provided in its upper face at points, say, between every other spoke with rectangular recesses 10, which receive rectangular metallic nuts 11, the screw-threaded bores of which register with plain bores 12 and 13 in the felly and tire, respectively, thereby forming continuous bores from the inside of the felly through the metallic tire. Set-screws 15 are inserted from the inside of the felly into said continuous bores, the threads thereon engaging the threads in the bores of the nuts and the pointed ends extending through the metallic tire and engaging recesses 16 in the under face of the rim 17 of the pneumatic tire, which, as usual, consists of an outer protective tire 20 and an inner inflatable tube 21.

For the purpose of securing the tire 20 to the rim, so that it can be removed therewith, I provide bolts 22, which extend through said rim, their heads seating in holes 23 in the under face of said rim intermediate the recesses 16, so as to come flush therewith, and their ends being provided with circular nuts 24, which bear against the inner faces of the outer tire and force the rounded flanges thereof into the recesses in the flanges 26 of the rim. A circular ring 30 is secured to the under face of the rim on the outer side of the wheel and is adapted when the rim is placed on to bear against the edge of the metallic tire and insure the proper positioning of the rim thereon, so that the set-screws when screwed in will engage the recesses in said rim.

From the foregoing description, considered in connection with the drawings, it will be readily understood that if the rim and pneumatic tire are in place and it is desired to remove them for the purpose of substituting another rim and tire or so that the vehicle can be run home on the metallic tires, it is only necessary by means of a wrench to turn the set-screws so that their ends disengage the recesses in the under face of the rim when the rim can easily and readily be pushed off toward the outer side of the wheel, and that if the rim and tire are off and it is desired to place them on it is only necessary to slide the rim on from the outer side of the wheel until the ring 30 contacts with the metallic tire and then turn the set-screws so that their ends engage the recesses in the rim.

It will also be appreciated that, in addition to the function above described, the ring 30 by bearing tightly against the metallic tire coacts with the set-screws in holding the rim of the pneumatic tire in place, and thereby relieves the screws of a great deal of strain.

I do not wish to be understood as limiting myself to the precise details and arrangements of parts shown and described, but reserve the right to all modifications within the scope of my invention.

Having now described my invention, what

I claim as new, and desire to secure by Letters Patent, is—

1. The combination of a wheel having a felly provided with recesses and bores leading into said recesses, nuts in said recesses having threaded bores registering with the bores in the felly, a permanent tire on said felly having bores registering with the recesses in the felly and nuts, a removable rim on said tire having recesses in its under face and set-screws adapted to be adjusted through said registering bores into and out of engagement with the recesses in said rim, substantially as described.

2. The combination of a wheel having a felly provided with recesses and bores leading into said recesses, nuts in said recesses having threaded bores registering with the bores in the felly, a permanent tire on said felly having bores registering with the recesses in the felly and nuts, a removable rim on said tire having recesses in its under face, and a ring adapted to abut against the permanent tire and set-screws adapted to be adjusted through said registering bores and into and out of engagement with the recesses in said rim, substantially as described.

Signed at New York, in the county of New York and State of New York, this 4th day of January, A. D. 1906.

JOHN C. SCHLEICHER.

Witnesses:
C. L. WOLF,
A. B. BLACKWOOD.